May 11, 1965 W. L. RUPP 3,182,969
BLENDING APPARATUS
Filed Oct. 31, 1961 2 Sheets-Sheet 1

INVENTOR.
WILLIAM L. RUPP
BY
OLSEN AND STEPHENSON
ATTORNEYS

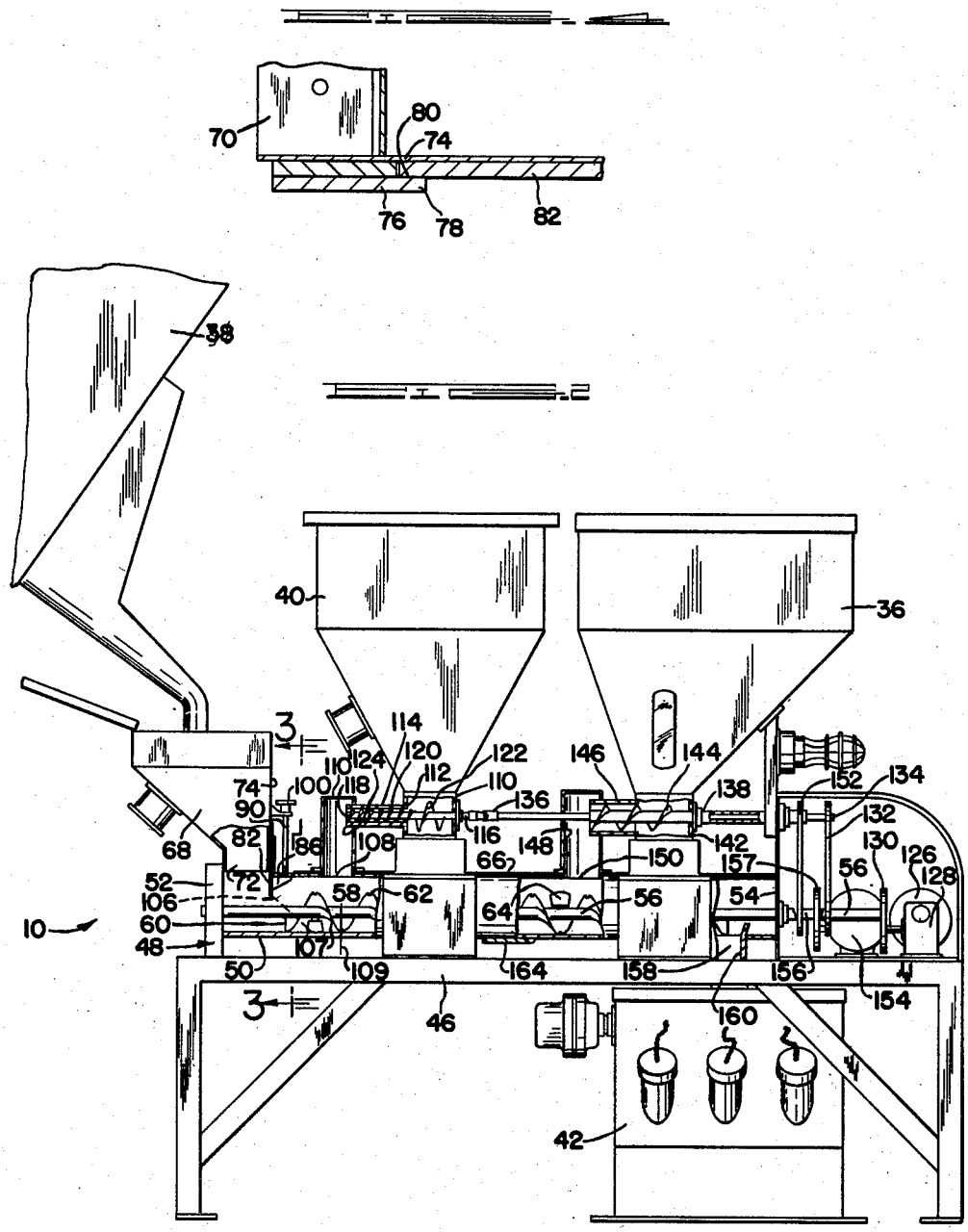

United States Patent Office 3,182,969
Patented May 11, 1965

3,182,969
BLENDING APPARATUS
William L. Rupp, Ann Arbor, Mich., assignor to Hoover Ball and Bearing Company, Ann Arbor, Mich., a corporation of Michigan
Filed Oct. 31, 1961, Ser. No. 148,937
7 Claims. (Cl. 259—25)

This invention relates generally to mixing and metering apparatus and more particularly to an improved apparatus for mixing a plurality of granular or pelletized materials and feeding these materials to a discharge station.

In the feeding of a plurality of granular materials, which must be mixed in a predetermined proportion, to a fabricating or other machine or point of use, considerable difficulty has been encountered in accurately proportioning the mix components. Some prior systems have utilized separate weighing scales for the mix components which add expense and complications to the feeding systems, and other prior systems have required intermediate mixing and handling operations which are independent of the balance of the material feeding operation. One example of a machine which must be supplied with a mixture of a plurality of granular materials is a blow molding machine which produces colored plastic containers and the like. Such a machine must be supplied with the virgin plastic material and a color concentrate material which is mixed in a predetermined accurate proportion with the virgin material to obtain a plastic article of desired color. It has also been found that an improved dispersion of color in the containers is obtained if reground plastic material, resulting from the grinding of scrap material, is also mixed with the color concentrate and the virgin material. In supplying these materials to the molding machine, a closed supply system in which the virgin material and the color concentrate are accurately mixed in a desired proportion, then mixed with available reground material, and then supplied to the machine is desirable. It is an object of this invention, therefore, to provide improved mixing and feeding apparatus in which the mix components are accurately proportioned, the proportions are readily adjusted to obtain a desired mix, and which is continuously or selectively operable in a closed feeding system to obtain the desired mix.

A further object of this invention is to provide mixing and feeding apparatus which includes improved metering means for controlling the quantities of the materials mixed in the apparatus.

Further objects, features and advantages of this invention will become apparent from a consideration of the following description, the appended claims, and the accompanying drawing in which:

FIGURE 2 is a fragmentary elevational view of the mixing and feeding apparatus of this invention, with some parts broken away and other parts shown in section for the purpose of clarity;

FIGURE 4 is a sectional view of a portion of the mixing apparatus of this invention, looking substantially along the line 4—4 in FIG. 3.

Figure 1:
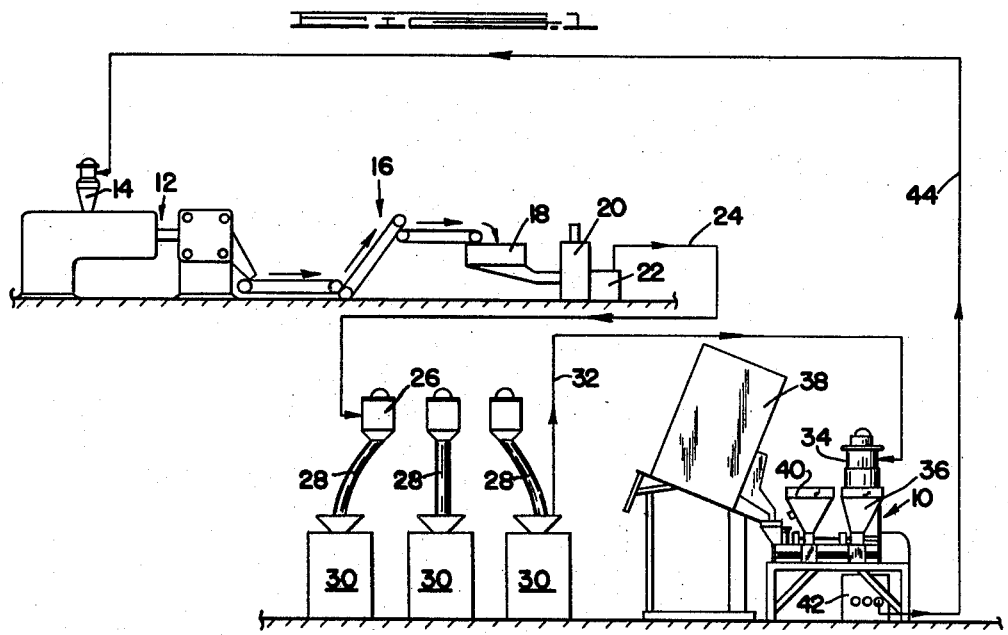
FIGURE 1 is a diagrammatic view of a feeding system which includes the apparatus of this invention for supplying raw material to a plastic molding machine.

With reference to the drawing, the mixing and feeding apparatus of this invention, indicated generally at 10, is illustrated in FIG. 1 in a system for supplying raw material to a blow molding machine 12 in which the material is heated and plasticized and blown into the form of colored objects such as containers. The raw material is supplied to a feeder 14 associated with the machine 12 and blow molded objects formed on the machine 12 are deposited on a conveyor assembly 16 which transports the objects to a plurality of work station hoppers 18, only one of which is shown. Containers which are acceptable in accordance with prevailing quality control standards are trimmed on a trim fixture 20 and are then packaged. Unacceptable objects are deposited in a granulator 22 which grinds the objects into pellet or granular form. Material trimmed from the acceptable containers at the trim fixture 20 is fed as scrap to the granulator 22 where it is ground into pellet or granular form. A conduit 24 which communicates with the granulator 22 transports the reground plastic material, which is of a color corresponding to the color of the objects to be formed in the machine 12, to either one of a plurality of feeder members 26. Flexible spouts 28 are provided for transferring the reground material from the feeders 26 to a plurality of surge hoppers 30. Material is selectively drawn out of the surge hoppers 30 through a line 32 by a vacuum feeder 34 which discharges the reground material into a hopper 36 mounted on the apparatus 10.

In the apparatus 10, the reground plastic material delivered to the hopper 36 is mixed with virgin plastic material, which is in an uncolored granular or pellet form, supplied to the apparatus 10 from a bin 38, and color concentrate material which is supplied to the apparatus 10 through a hopper 40. The mixed virgin plastic material, color concentrate, and reground plastic material is transported from a container 42 associated with the apparatus 10 through a conduit 44 to the feeder 14 on the machine 12.

The apparatus 10 (FIG. 2) consists of a main frame 46 which supports a substantially horizontally extending screw-conveyor 48. The conveyor 48 includes a substantially horizontally extending trough 50 which is provided with end plates 52 and 54 that are supported on the main frame 46. A horizontally extending screw conveyor shaft 56 is journaled on the end plates 52 and 54 and carries a screw thread 58 which terminates at one end 60 in a spaced relation with the end plate 52. The screw thread 58 may be of any construction suitable for moving material supplied to the trough 50 from left to right as viewed in FIG. 2 and for intimately mixing various materials which are fed to the trough 50. The screw thread 58 is illustrated as being of a type having notches 62 which are positioned diametrically opposite paddles 64 which are secured to the shaft 56 for thereby providing improved mixing of materials in the trough 50.

Figure 3:
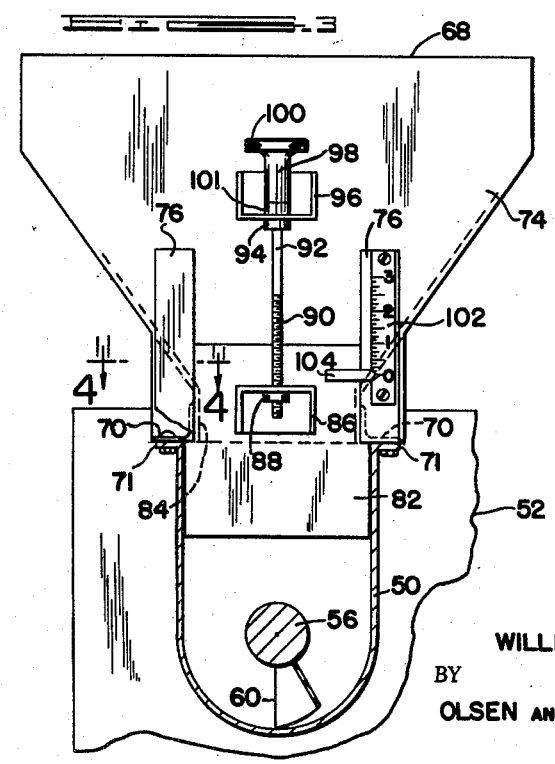
FIGURE 3 is an enlarged fragmentary sectional view of a portion of the apparatus of this invention, looking substantially along the line 3—3 in FIG. 2.

The top of the trough 50 is closed by a plate 66 which terminates at one end in a spaced relation with the trough end plate 52. A hopper 68 has side flanges 70 which are secured to flanges 71 on the top side of the trough 50 so that the hopper 68 projects upwardly from the trough 50 and has its lower outlet end 72 positioned in the space between the trough end plate 52 and the trough cover 66. A pair of guide plates 76 are secured to one side wall 74 on the hopper 68 so that an end portion 78 of each plate 76 is disposed in a spaced relation with the hopper side wall 74. The space 80 formed between each plate 78 and the side wall 74 constitutes a guideway for one edge of a sliding gate 82 which extends into the guideways 80. As shown in FIG. 3, the gate is of a width slightly greater than the width of the opening 84 in the lower end of the hopper 68.

A bracket 86 is secured to and extends transversely outwardly from one side of the gate 82 and has a threaded boss 88 secured thereto. A threaded shaft 90 is threaded into the boss 88 and projects upwardly from the bracket 86. The shaft 90 has an unthreaded upper end portion 92 to which a stop disk 94 is secured and the disk 94 abuts the lower side of a bracket 96 secured to the side wall 74 of the hopper 68 in substantially vertical alignment with the bracket 86. A handle 98, having a knurled enlarged upper end portion 100, is secured to the upper end of the shaft 90 so that the lower end of the handle 98 abuts the top side of a boss 101 secured to the bracket 96. On rotation of the handle 98, the threaded shaft 90 moves axially relative to the threaded boss 88 and since the shaft 90 is restrained against up and down movement by the bracket 96, the bracket 86 and the gate 82 are movable up and down on the shaft 90, with the gate 82 sliding in the guideways 80. A graduated scale 102, secured to one of the guide plates 76 cooperates with a pointer 104 secured to the slide gate 82 to visually indicate the vertical position of tht slide gate 82.

As shown in FIG. 2, the slide gate 82 is movable downwardly to a position in which it projects into the trough 50. As a result, the position of the slide gate 82 determines the position of the mass of virgin plastic material which is loaded into the trough 50 from the hopper 68 since this material must flow under the lower edge of the slide gate 82. In other words, when the hopper 68 is filled with a granular flowable material such as virgin plastic material in this form, a mass of such material flows out of the hopper opening 84 and is deposited in the trough 50. The amount of this material which will be deposited in the trough 50 is determined by the location of the slide gate 82. This mass of material will have a side surface 106 (FIG. 2) disposed below and extending at an angle to the slide gate 82, and the inclination of the surface 106 is dependent on the physical characteristics, namely, the angle of repose of the material supplied to the hopper 68. If the slide gate 82 is moved upwardly from its position shown in FIG. 2, the position the surface 106 of the mass of material in the trough 50 assumes will likewise be located above the position shown in FIG. 2. Similarly, if the slide gate 82 is moved downwardly, the side surface 106 of the virgin plastic material will be located below the position shown, but for a given material the angle of the surface 106 relative to the shaft 56 will in all cases be substantially constant because it is dependent on the angle of repose of the material.

As a result, the position of the slide gate 82 determines the point on the screw conveyor shaft 56 which will be intersected by the surface 106. The maximum amount of material which can be removed from the mass of virgin material in the trough 50 by the screw conveyor 48, during each revolution of the shaft 56, is the amount of material which can be carried by a full flight of the screw thread 58. A flight of the thread 58 consists of a length of the thread 58 which extends entirely around the shaft 56. For example, one end flight of the thread 58, indicated at 107 in FIG. 2, extends from the thread end 60 to a line 109 on the thread 58 which is coplanar with a plane extending radially of the shaft 56 and including the thread end 60. The thread end 60 is positioned so that the surface 106 will in all cases intersect a plane perpendicular to the shaft 56 through the line 109 at a position below the top edge of the flight 107. In other words, the thread end 60 is located relative to the slide gate 82 such that the surface 106 is located in a position in which the flight 107 is not filled to capacity. As a result, the amount of material removed from the mass of virgin material by the screw conveyor 48 is always less than the capacity of the conveyor 48.

Accordingly, the amount of material removed from the mass to material in the trough 50 during each revolution of the screw thread 58 is determined by the location of the material side surface 106. In other words, if the material in the hopper 68 is maintained at a level above the opening 84, the amount of material moved from left to right in the trough 50 from the mass of material in the lower end of the trough is dependent on the position of the slide gate 82. It can thus be seen that the adjustment of the slide gate 82 determnies the quantity of material removed from the hopper 68 by the screw conveyor 48 during each revolution of the shaft 56.

The trough cover 66 is provided with an opening 108 which communicates with the lower end of a funnel 110 positioned to one side of the color concentrate supply funnel 40 which is mounted on the main frame 46. The lower end of the funnel 40 is vertically aligned with a container or housing 110' having an opening 112 in one side which is aligned with a tubular discharge casing 114 which extends into the funnel 110. A shaft 116, journaled on the container 110' has a portion 118 which projects axially through the casing 114. A screw thread 120 is mounted on the shaft portion 118 and is disposed in a closely spaced relation with the interior surface of the casing 114. A much larger screw thread 122 is secured to the shaft 116 at a position within the container 110.

When the hopper 40 is maintained filled with color concentrate material, which is in a pellet or granular form, to a level above the upper end of the container 110', the screw thread 122 operates to transfer material from the container 110' to the adjacent end of the casing 114 at a rate much faster than the smaller screw thread 120 can move this material to the discharge end 124 of the casing 114. Consequently, the casing 114 is continuously maintained filled with plastic material so that for a uniform rate of rotation of the shaft 116, a uniform rate of discharge of color concentrate is obtained at the discharge end 124 of the tubular casing 114. This material flows downwardly through the funnel 110 into the trough 50 where it is mixed with the virgin plastic material in the trough 50 by the screw conveyor 48 and the mixture is moved from left to right as viewed in FIG. 2.

The shafts 56 and 116 are rotated by a common drive motor 126 so that the speeds of rotation of the shafts 56 and 116 are maintained at a given desired ratio to obtain a predetermined proportioning of the virgin plastic material and the color concentrate material which are mixed in the trough 50. The motor 126 drives a gear reducer 128 which in turn drives a gear set 130 which drives the shaft 56. A sprocket and chain assembly 132 connected to the shaft 56 provides for a drive of a shaft 134 which is connected to the shaft 116 by a joint 136. As a result, the speed of rotaiton of the shaft 116 is at all times proportional to the speed of rotation of the shaft 56.

The shaft 134 extends axially through a tubular shaft 138 which is journaled on the trough end plate 54 and a container 142 which is mounted on the main frame 46 at a posiiton below and in communication with the hopper 36 for reground plastic material. The shaft 138 extends through the container 142 and is provided with a screw thread 144 which also extends through a tubular discharge conduit 146 mounted on one side of the container 142. The conduit 146 communicates at its discharge end with an upright funnel 148 which is aligned with an opening 150 in the trough cover 66. The shaft 138 is driven by a sprocket and chain assembly 152 mounted thereon and connected to a drive shaft 156. The drive shaft 156 is in turn driven by a sprocket and chain assembly 157 connected to a gear reducer (not shown) driven by a motor 154 on the main frame 46.

It can thus be seen that as the mixed color concentrate and virgin plastic material is moved from left to right in the trough 50 by the screw thread 58 it is mixed with the reground plastic material when it reaches a point below the opening 150. As the material in the trough 50 moves to the right of a position below the opening 150, all three materials are intimately mixed and are ultimately discharged through a discharge opening 158 in the trough 50 which communicates with a downwardly extending conduit 160 which empties into a container 42 disposed below the trough 50. As previously described, the mix material in the container 41 is then transported by means of the conduit 44 to the feeder 14 for the machine 12.

In the use of the apparatus 10 in the system shown in FIG. 1, the hoppers 68 and 40 are filled with virgin plastic material and color concentrate material respectively, and the motor 126 is started to provide for rotation of the shafts 56 and 116. The handle 98 is manipulated to provide for an adjustment of the slide gate 82 to provide approximately the desired rate of feed of the virgin plastic material. The funnel 110 is removed and a container is positioned below the discharge end 124 of the casing 114 for a predetermined time period to collect the color concentrate material discharged through the casing 114. A hinged door 164 provided in the bottom side of the trough 50 at a position between the openings 108 and 150 is then opened and a container is positioned below the door opening so that virgin plastic material fed by the screw conveyor 48 is similarly collected for the same time period. The relative amounts of material collected from the hopper 40 and the hopper 68 are then compared to determine whether or not the desired proportions of virgin plastic material and color concentrate are being discharged into the trough 50. If the amount of virgin plastic material is too high, the slide gate 82 is moved downwardly, and if it is too low, the slide gate 82 is adjusted in an upward direction, with the pointer 104 and the scale 102 being utilized to insure accurate small increments of movement of the gate 82. The testing process is then repeated until the desired proportions of color concentrate material and virgin plastic material are obtained. The funnel 110 is replaced and the door 164 is closed and the apparatus 10 is in condition for continuous or selective operation, whichever is desired to provide for a feed of the correct proportions of materials to the machine 12. The speed of the motor 154 may be adjusted to provide for the desired rate of feed of reground plastic material from the hopper 36 into the trough 50. Normally, all the reground plastic material is refed to the trough 50 and this material will usually comprise 25 to 30% of the mix which is ultimately discharged into the container 42. During use of the apparatus 10, the motor 126 can be shut off and the door 164 can be opened and a sample of mixed color concentrate and virgin material can be removed and analyzed to determine if the desired proportions of each are being blended in the apparatus 10.

From the above description it is seen that this invention provides apparatus 10 in which the amounts of granular materials from the hopper 68 and 40 which are fed to the trough 50 are accurately controlled so that a desired proportion of these materials is mixed in the trough 50. As used herein, the term "granular" is inclusive of any substantially dry material in particle or pellet form which can be utilized in the apparatus 10. In order for such a material to be adaptable to discharge into the trough 50 it must be of a physical characteristic such that it will flow and thus assume a constant angle of repose so that the side surface 106 of the mass of material in the trough 50 is at a substantially constant angle with respect to the axis of the screw conveyor shaft 56. The plurality of materials supplied to the trough 50 are both intimately mixed therein and conveyed to the container 42 so that they may be used as a mixture.

It will be understood that the mixing and blending apparatus which is herein disclosed and described is presented for purposes of explanation and illustration and is not intended to indicate limits of the invention, the scope of which is defined by the following claims.

What is claimed is:

1. In apparatus for blending a plurality of substantially granular flowable materials in predetermined proportions, a screw conveyor comprising a substantially horizontal trough having a shaft rotatably mounted therein, a thread on said shaft comprised of a plurality of flights arranged end to end, said trough having an inlet end and the endmost flight on said shaft adjacent said inlet end being spaced therefrom in a direction axially of said shaft, a supply hopper for one of said materials communicating with and extending upwardly from said inlet end so that said one material will flow into said inlet end and have a surface disposed at a predetermined angle relative to said shaft dependent on the angle of repose of said material, adjustable means extending into said inlet end transverse to said axis for contact with said material at a position to confine said material so that said surface thereof intersects said endmost flight at a position dependent on the location of said adjustable means, and means for discharging another material into said screw conveyor at a position spaced axially thereof from the inlet end of said trough.

2. In apparatus for blending a plurality of substantially granular flowable materials in predetermined proportions, a screw conveyor having an axis of rotation and an inlet end, a supply hopper for one of said materials communicating with and extending upwardly from said inlet end so that said one material will flow into said inlet end and have a surface disposed at a predetermined angle relative to said axis dependent on the angle of repose of said material, adjustable gate means extending into said inlet end transverse to said axis for contact with said material at a position to determine the location of said surface of said material in a direction axially of said conveyor, means for discharging another material into said screw conveyor at a position spaced axially thereof from said inlet end, said means comprising a tubular casing communicating with said screw conveyor, a shaft extending substantially axially through said casing, a first thread on said shaft positioned in a closely spaced relation with the internal surface of said casing, a second thread on said shaft of a diameter greater than said first thread and disposed outwardly of said casing, housing means for said second thread, and means for feeding said other material to said housing means so that said second thread maintains said casing substantially filled with said other material.

3. In apparatus for blending a plurality of substantially granular flowable materials in predetermined proportions, a screw conveyor comprising a trough having an inlet end, a shaft rotatably supported in said trough, a screw thread on said shaft having a plurality of end to end flights, an endmost one of which is adjacent said inlet end of said trough, a supply hopper for one of said materials communicating with and extending upwardly from said inlet end so that said one material will flow into said inlet end and have a surface disposed at a predetermined angle relative to said shaft dependent on the angle of repose of said material, adjustable gate means extending into said inlet end transverse to said axis for contact with said material at a position to confine said material so that said surface intersects said one endmost flight and to determine the location of said surface of said material in a direction axially of said one flight, means for discharging another material into said screw conveyor at a position spaced axially thereof from said inlet end, said means comprising a tubular casing communicating with said screw conveyor, a shaft extending substantially axially through said casing, a first thread on said casing shaft positioned in a closely spaced relation with the internal surface of said casing, a second thread on said casing shaft of a diameter greater than said first thread and disposed outwardly of said casing, housing means for said second thread, means for feeding said other material to said housing means so that said second thread maintains said casing substantially full of said other material, and common drive means for said shafts operable to maintain a proportional speed of rotation thereof.

4. In mixing and metering apparatus, a substantially horizontal trough, a substantially horizontal feed and mixing screw in said trough, said screw including a rotatable shaft and a thread on said shaft having a plurality of end to end flights, the endmost flight on said shaft adjacent one end thereof being disposed in a spaced relation with one end of said trough, means for continuously supplying material to be mixed and metered to said one end of said trough so that a mass of said material is continuously present in said end of said trough at a position such that one side surface of said mass extends transversely across said endmost flight and said shaft at an acute angle relative thereto so that on each revolution of said shaft a predetermined quantity of material is removed from said mass by said endmost flight and moved axially of said shaft by said thread, and a metering plate projected into said trough into a position intersecting said one side surface of the mass to thereby determine the location of said side surface in said trough in a direction axially of said endmost flight.

5. In a system for supplying raw material to a molding machine for forming colored plastic objects,
   (a) a screw conveyor comprising a substantially horizontal trough, a substantially horizontal first shaft mounted for rotation in said trough, and a first thread secured to said shaft and comprised of a plurality of end to end flights one endmost one of which is adjacent to and disposed in a spaced relation with one end of said trough,
   (b) a hopper for virgin plastic material mounted above and communicating with said trough adjacent said one end thereof so that material from said hopper flows into said trough and across said one flight so that on each revolution of said threads a predetermined quantity of said material is moved axially of said shaft by said one flight, a gate slidably mounted on said hopper and projected into said trough in a direction transversely of said one flight for determining the location on said flight of said material to thereby control the amount of said material moved axially of said thread on each revolution thereof,
   (c) hopper means for color concentrate material, means including a second shaft for feeding material therefrom to said trough,
   (d) a hopper for reground colored plastic material, means for feeding material from said hopper to said trough at a position spaced from said one end thereof,
   (e) container means communicating with said trough adjacent the opposite end thereof for receiving material discharged from said trough,
   (f) conduit means connected to said container means and adapted to supply material therefrom to said molding machine,
   (g) and common drive means for said shafts for maintaining a constant ratio of the rates of rotation thereof so that predetermined proportionate amounts of said virgin and color concentrate material are mixed by said first thread in said trough and are mixed with said reground material for delivery to said molding machine.

6. In mixing and metering apparatus, a substantially horizontal trough having a pair of upright substantially parallel sides, a substantially horizontal feed and mixing screw in said trough, said screw including a rotatable shaft and a thread on said shaft which is comprised of a plurality of end-to-end flights, one endmost one of said flights being spaced from and disposed adjacent one end of said trough, means for continuously supplying material to be mixed and metered to the top side of said one end of said trough so that a mass of said material is continuously present in said end of said trough at a position such that one side surface of said mass extends transversely across said shaft at an acute angle relative thereto and extends transversely across said one flight of said thread so that on each revolution of said shaft a quantity of material is removed from said mass by said one flight and moved axially of said shaft by said thread, a metering plate adjustably mounted for up and down movement so that it projects into said trough at a position extending between said trough sides and in a vertical plane between said one end of said trough and said one flight, said plate being disposed entirely above said shaft and being movable to positions intersecting said one side surface of the mass to thereby determine the location of said side surface in said trough in a direction axially of said one flight.

7. In mixing and metering apparatus, a substantially horizontal trough having a pair of upright substantially parallel sides, a substantially horizontal feed and mixing screw in said trough, said screw including a rotatable shaft and a thread on said shaft which is comprised of a plurality of end-to-end flights, one endmost one of said flights being spaced from and disposed adjacent one end of said trough, a hopper extending upwardly from said one end of said trough for continuously supplying material to be mixed and metered to said one end of said trough so that a mass of said material is continuously present in said end of said trough at a position such that one side surface of said mass extends transversely across said shaft at an acute angle relative thereto and extends transversely across said one flight of said thread so that each revolution of said shaft a quantity of material is removed from said mass by said one flight and moved axially of said shaft by said thread, a metering plate slidably mounted on said hopper for adjustable up and down movement so that it projects into said trough at a position extending between said trough sides and in a vertical plane between said one end of said trough and said one flight, a support bracket on said plate, a nut secured to said plate, a plate adjustment rod rotatably mounted on said hopper and threadably engaged with said nut for raising and lowering said plate in response to rotation of said rod, and coacting indicator means on said hopper and plate indicating the vertical position of said plate, said plate being disposed above said shaft and being movable to positions intersecting said one side surface of the mass to thereby determine the location of said side surface in said trough in a direction axially of said one flight.

References Cited by the Examiner

UNITED STATES PATENTS

| 520,138 | 5/94 | Dralle | 259—25 X |
| 986,553 | 3/11 | Derby | 259—25 |
| 998,048 | 7/11 | Thomas. | |
| 1,113,381 | 10/14 | Thomas | 259—97 X |
| 1,780,067 | 10/30 | Cox | 159—9 X |
| 2,692,714 | 10/54 | Goldberg et al. | 259—45 X |
| 2,741,401 | 4/56 | Kehres et al. | |

WALTER A. SCHEEL, *Primary Examiner.*

LEO QUACKENBUSH, *Examiner.*